（12）United States Patent
Conard et al.

(10) Patent No.: US 10,105,011 B2
(45) Date of Patent: *Oct. 23, 2018

(54) MAGNETIC DISK COUPLER FOR BLENDING APPARATUS WITH ENERGY STORAGE

(71) Applicant: WHIRLPOOL CORPORATION, Benton Harbor, MI (US)

(72) Inventors: Wayne Conard, Stevensville, MI (US); Paul Paget, Kalamazoo, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/857,190

(22) Filed: Dec. 28, 2017

(65) Prior Publication Data

US 2018/0132667 A1    May 17, 2018

Related U.S. Application Data

(63) Continuation of application No. 14/625,214, filed on Feb. 18, 2015, now Pat. No. 9,883,772.

(60) Provisional application No. 61/952,195, filed on Mar. 13, 2014.

(51) Int. Cl.
| | | |
|---|---|---|
| *A47J 43/046* | (2006.01) | |
| *A47J 43/08* | (2006.01) | |
| *H02K 49/10* | (2006.01) | |

(52) U.S. Cl.
CPC ......... *A47J 43/085* (2013.01); *A47J 43/0465* (2013.01); *H02K 49/10* (2013.01)

(58) Field of Classification Search
CPC .................. A47J 43/085; A47J 43/0465
USPC .................. 366/205, 206, 273, 274, 601
See application file for complete search history.

(56) References Cited

U.S. PATENT DOCUMENTS

| | | | |
|---|---|---|---|
| 2,825,539 A | * | 3/1958 | Smallegan ............. B65D 88/68 366/343 |
| 3,548,280 A | | 12/1970 | Cockroft |
| 3,721,875 A | | 3/1973 | Feldner et al. |
| 4,410,819 A | | 10/1983 | Kobayashi et al. |
| 5,060,151 A | | 10/1991 | Mikyska et al. |
| 5,347,205 A | | 9/1994 | Piland |
| 5,834,739 A | | 11/1998 | Lockwood et al. |
| 6,095,677 A | | 8/2000 | Karkos, Jr. et al. |
| 6,397,735 B1 | | 7/2002 | Wong |
| 6,634,782 B2 | | 10/2003 | Barton et al. |
| 7,632,007 B2 | | 12/2009 | Wulf et al. |
| 8,485,715 B1 | | 7/2013 | Bohannon, Jr. et al. |

(Continued)

FOREIGN PATENT DOCUMENTS

WO    2012076848    6/2012

*Primary Examiner* — David Sorkin
(74) *Attorney, Agent, or Firm* — Price Heneveld LLP

(57) ABSTRACT

A blending appliance includes a housing having a motor compartment and a jar receiving portion spaced laterally therefrom. The jar receiving portion is disposed below an upper housing. A motor is disposed in the motor compartment and is adapted to drive a blade assembly of the jar through a magnetic coupling system. The motor is connected to a blade assembly disposed within the jar through a series of gears or belts, and finally through a magnetic coupler. The magnetic coupler is configured such that it stores kinetic energy while the motor is running at a high speed, and releases the stored energy when the motor is running at a slower speed.

20 Claims, 15 Drawing Sheets

(56) References Cited

U.S. PATENT DOCUMENTS

| | | | |
|---|---|---|---|
| 9,883,772 B2 * | 2/2018 | Conard | A47J 43/085 |
| 2001/0002892 A1 | 6/2001 | Karkos, Jr. et al. | |
| 2009/0285958 A1 | 11/2009 | Garcia | |
| 2010/0214867 A1 | 8/2010 | Karkos, Jr. et al. | |

* cited by examiner

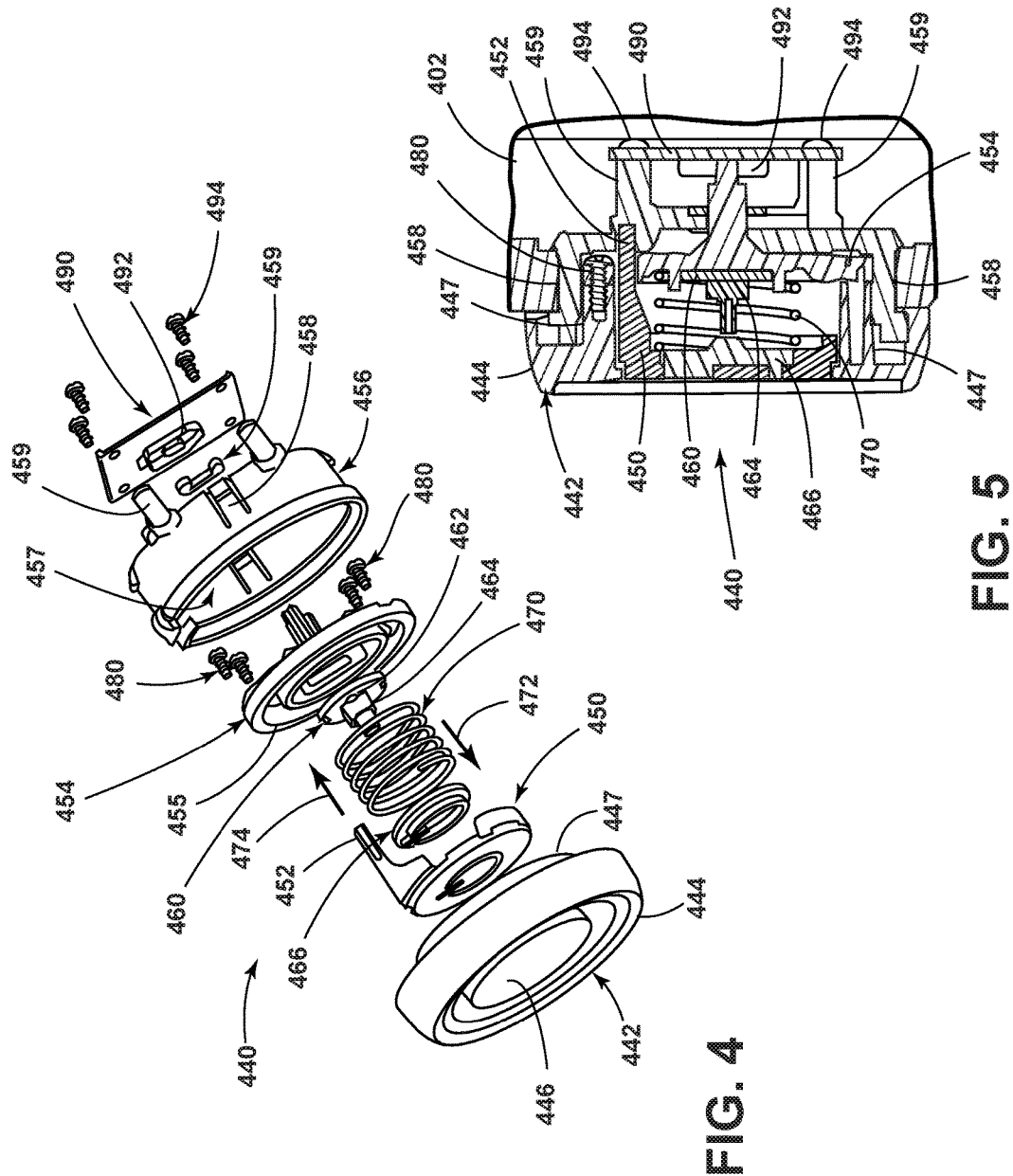

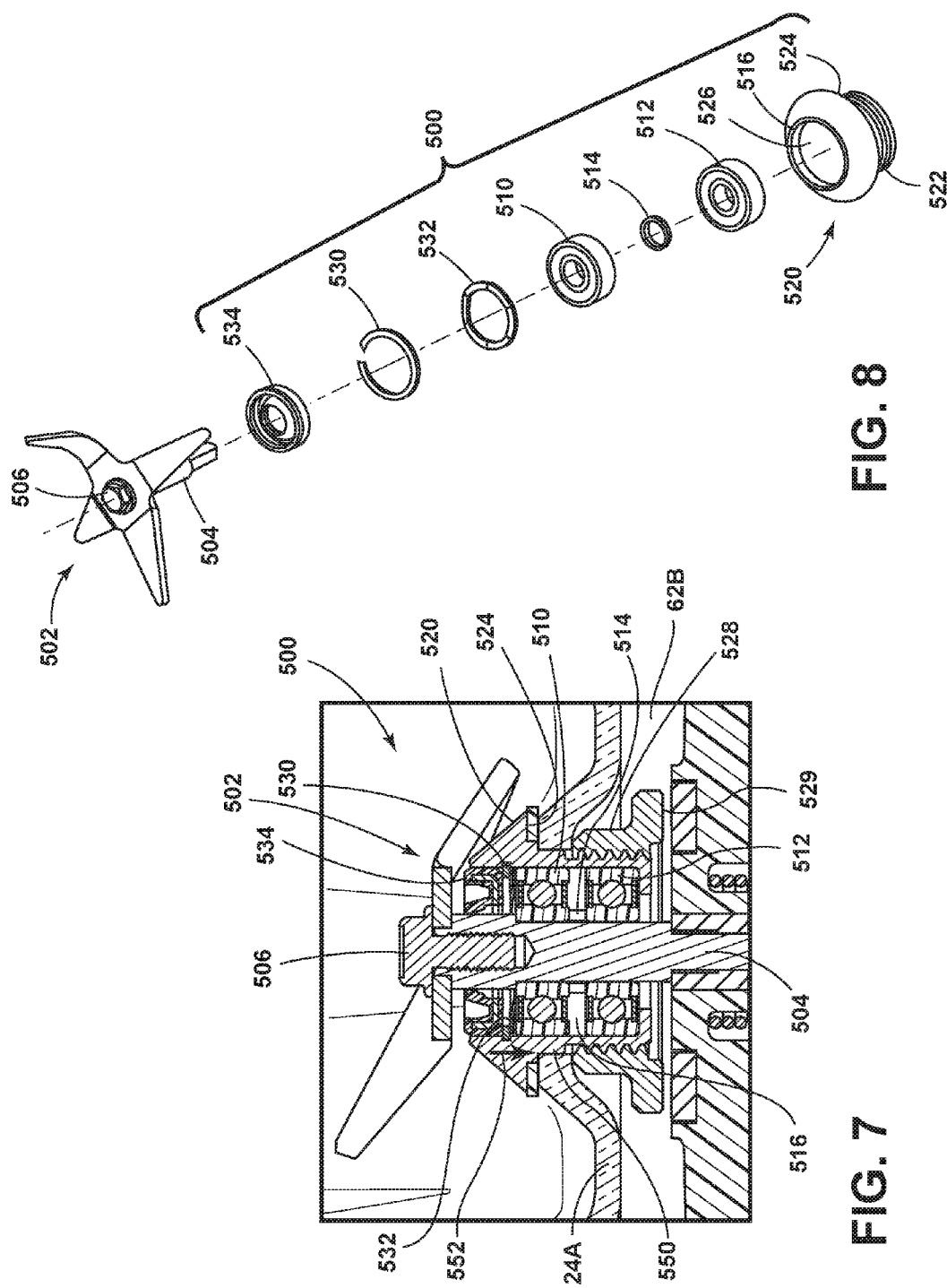

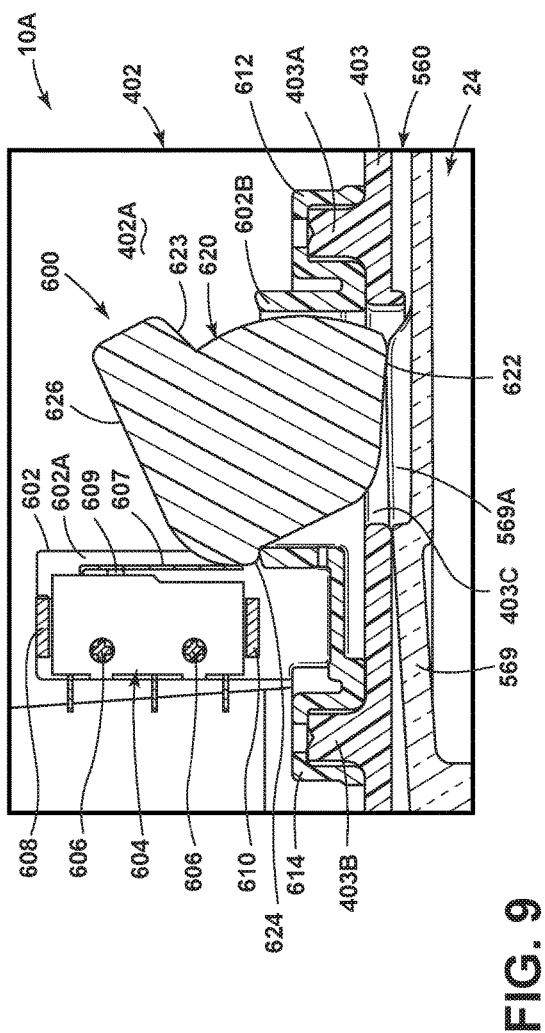
FIG. 9
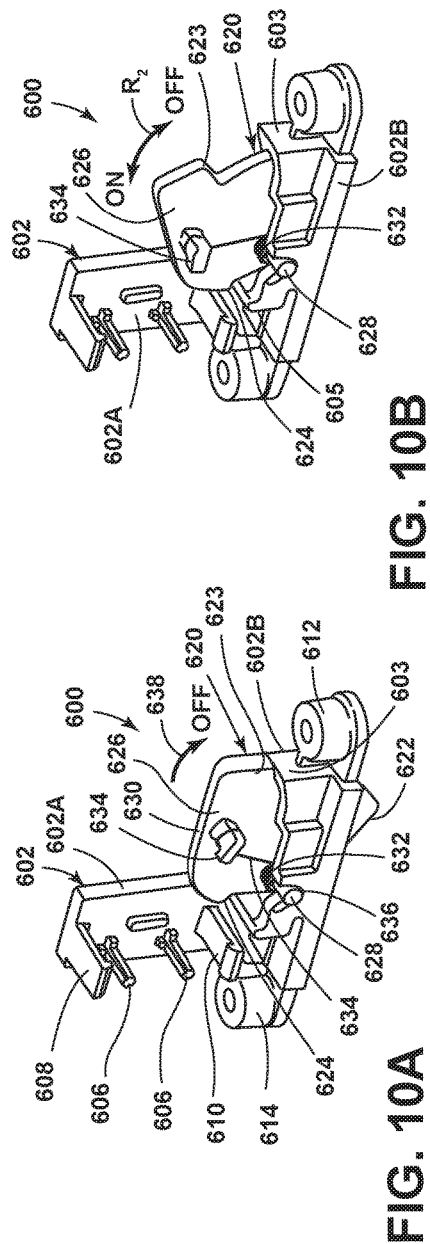
FIG. 10A
FIG. 10B

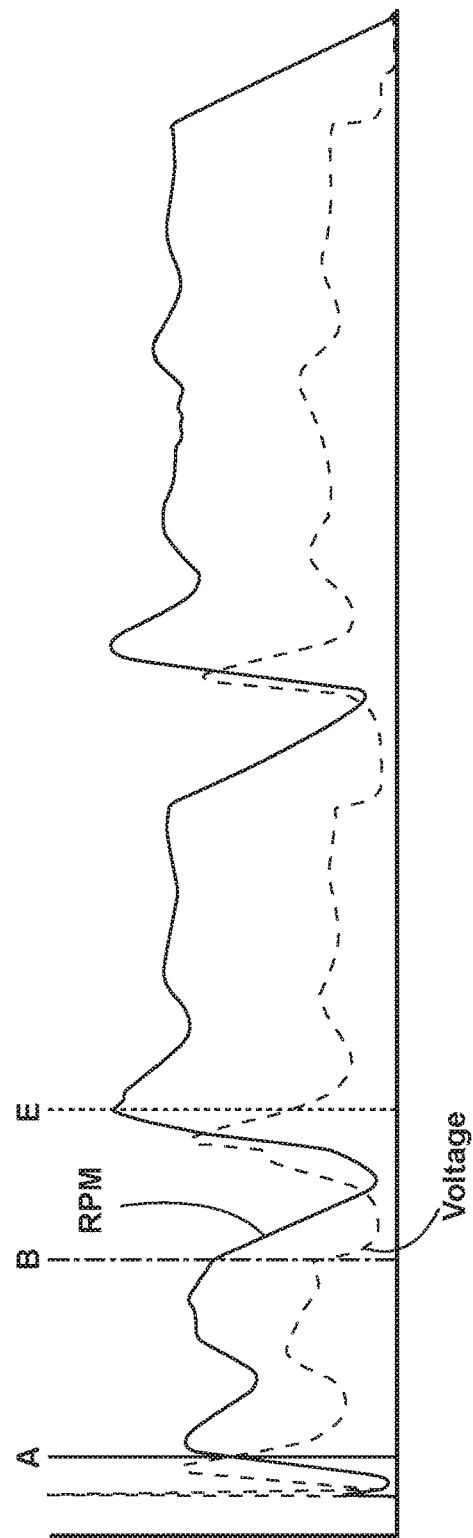

MAGNETIC DISK COUPLER FOR BLENDING APPARATUS WITH ENERGY STORAGE

CROSS-REFERENCE TO RELATED APPLICATION

This application is a continuation of U.S. patent application Ser. No. 14/625,214 (now U.S. Pat. No. 9,883,772), filed on Feb. 18, 2015, entitled MAGNETIC DISK COUPLER FOR BLENDING APPARATUS WITH ENERGY STORAGE, the entire disclosure of which is hereby incorporated by reference. This application claims priority to and the benefit under 35 U.S.C. § 119(e) of U.S. Provisional Patent Application No. 61/952,195, filed on Mar. 13, 2014, entitled MAGNETIC DISK COUPLER FOR BLENDING APPARATUS WITH ENERGY STORAGE, the entire disclosure of which is hereby incorporated herein by reference.

BACKGROUND

The present concept generally relates to a blending appliance, and more particularly to a blending appliance, wherein a blade assembly disposed within a blending jar is magnetically coupled to a drive system via a coupler that has the ability to store and release kinetic energy.

SUMMARY

One aspect of the present concept includes a method of breaking an air pocket around a blade assembly of a blending appliance. The method includes connecting a motor drive shaft to a motor and a motor drive gear, and further connecting the motor drive gear to a first magnetic coupler. The first magnetic coupler is magnetically coupled to a second magnetic coupler, which is attached to a blender blade assembly. The first magnetic coupler stores kinetic energy as the motor and blade assembly are brought up to a high speed, and releases the stored energy when the motor and blade assembly are slowed to a speed below about 1000 revolutions per minute (rpm), which allows the blade to continue spinning at speeds of about 500 rpm, thereby breaking up air pockets that may form around the blade assembly.

Another aspect of the present concept includes a method of running a blending appliance at a low voltage setting. The method includes the steps of providing a housing having a motor compartment and a jar receiving portion spaced laterally from the motor compartment, wherein the housing includes a laterally extending upper housing portion. A motor is disposed in the motor compartment and is configured to power a magnetic coupling system to further rotate a blade assembly disposed in a blender jar. The blade assembly is accelerated to a rotational speed above 1000 revolutions per minute by increasing an electric voltage and current to the motor, rotating a drive shaft operably coupled to the motor and a motor drive gear, rotating a first magnetic coupler indirectly coupled with the motor drive gear, rotating a second magnetic coupler magnetically coupled to the first magnetic coupler; and rotating the blade assembly operably coupled with the second magnetic coupler. An amount of kinetic energy is stored in the first magnetic coupler as the first magnetic coupler rotates under the power of the motor. A portion of the kinetic energy is released by the first magnetic coupler when the rotational speed of the blade assembly is slowed to a rotational speed below 1000 revolutions per minute.

Another aspect of the present concept includes a method of reducing a bridging effect in a blending appliance. The method includes the steps of providing a blending appliance having a housing with a motor. The blending appliance further comprising a support base having a first magnetic coupler rotatably housed therein and powered by the motor. A blender jar is removeably received in the housing over the support base, and includes a receptacle portion disposed over a base portion. A second magnetic coupler is rotatably housed in the base portion and is magnetically coupled to the first magnetic coupler for magnetic rotation with the first magnetic coupler when the blender jar is received in the housing. The second magnetic coupler is coupled to a blade assembly which is disposed in the receptacle portion of the blender jar. Ingredients are provided to the receptacle portion of the jar and a voltage across the motor is increased to rotate the first magnetic coupler as powered by the motor. An amount of kinetic energy is then stored in the first magnetic coupler. The second magnetic coupler is then rotated as magnetically coupled to the first magnetic coupler. The blade assembly disposed in the receptacle portion of the jar is rotated to a rotational speed sufficient to cause a bridging effect in the ingredients disposed in the receptacle portion of the jar. At this point in the method, the voltage across the motor is decreased and a portion of the amount of kinetic energy stored in the first magnetic coupler is released. The kinetic energy released powers the blade assembly, such that the rotational speed of the blade assembly gradually decreases while the motor is maintained at a low voltage setting.

Yet another aspect of the present concept includes a method of increasing efficiency in a motor of a blending appliance. The method includes the steps of providing a blending appliance having a housing with a motor and a support base having a first magnetic coupler powered by the motor for rotational movement. A blender jar is removeably received in the housing and includes a receptacle portion and a base portion. The base portion includes a second magnetic coupler which is magnetically coupled to the first magnetic coupler. The second magnetic coupler is further coupled to a blade assembly which is disposed in the receptacle portion of the blender jar. The motor is energized to a first voltage setting having a first amperage setting. The first magnetic coupler is rotated as powered by the motor. An amount of kinetic energy is then stored in the first magnetic coupler as it rotates. The second magnetic coupler is also rotated with the first magnetic coupler as magnetically coupled to the first magnetic coupler. The blade assembly disposed in the receptacle portion of the jar is also rotated at a first rotational speed. The motor is then de-energized by providing a second voltage setting to the motor having a second amperage setting, wherein the second voltage setting is less than the first voltage setting, and further wherein the second amperage setting is less than the first amperage setting. At this point, a portion of the amount of kinetic energy stored in the first magnetic coupler is released, such that the rotation of the blade assembly is allowed to decrease from the first rotational speed to a lower second rotational speed.

These and other aspects, objects, and features of the present concept will be understood and appreciated by those skilled in the art upon studying the following specification, claims, and drawings.

BRIEF DESCRIPTION OF THE DRAWINGS

In the drawings:

FIG. 4 is a perspective exploded view of a user-interface;

FIG. 5 is an assembled cross-sectional view of the user-interface of FIG. 4 as coupled to an upper housing;

FIG. 7 is a cross-sectional view of a bearing assembly and an associated blade assembly;

FIG. 8 is a top perspective exploded view of the bearing assembly of FIG. 7;

FIG. 9 is a cross-sectional view of an upper portion of a blender jar, cap and interlock switch assembly;

FIG. 10A is a top perspective view of the interlock switch assembly of FIG. 9 in an "OFF" position;

FIG. 10B is a top perspective view of the interlock switch assembly of FIG. 10A in an "ON" position;

FIG. 13B is a schematic representation measuring the rotational speed of the blender motor of FIG. 13A, and further measuring voltage across the motor during the blending sequence of FIG. 13A;

DETAILED DESCRIPTION

Figure 1:
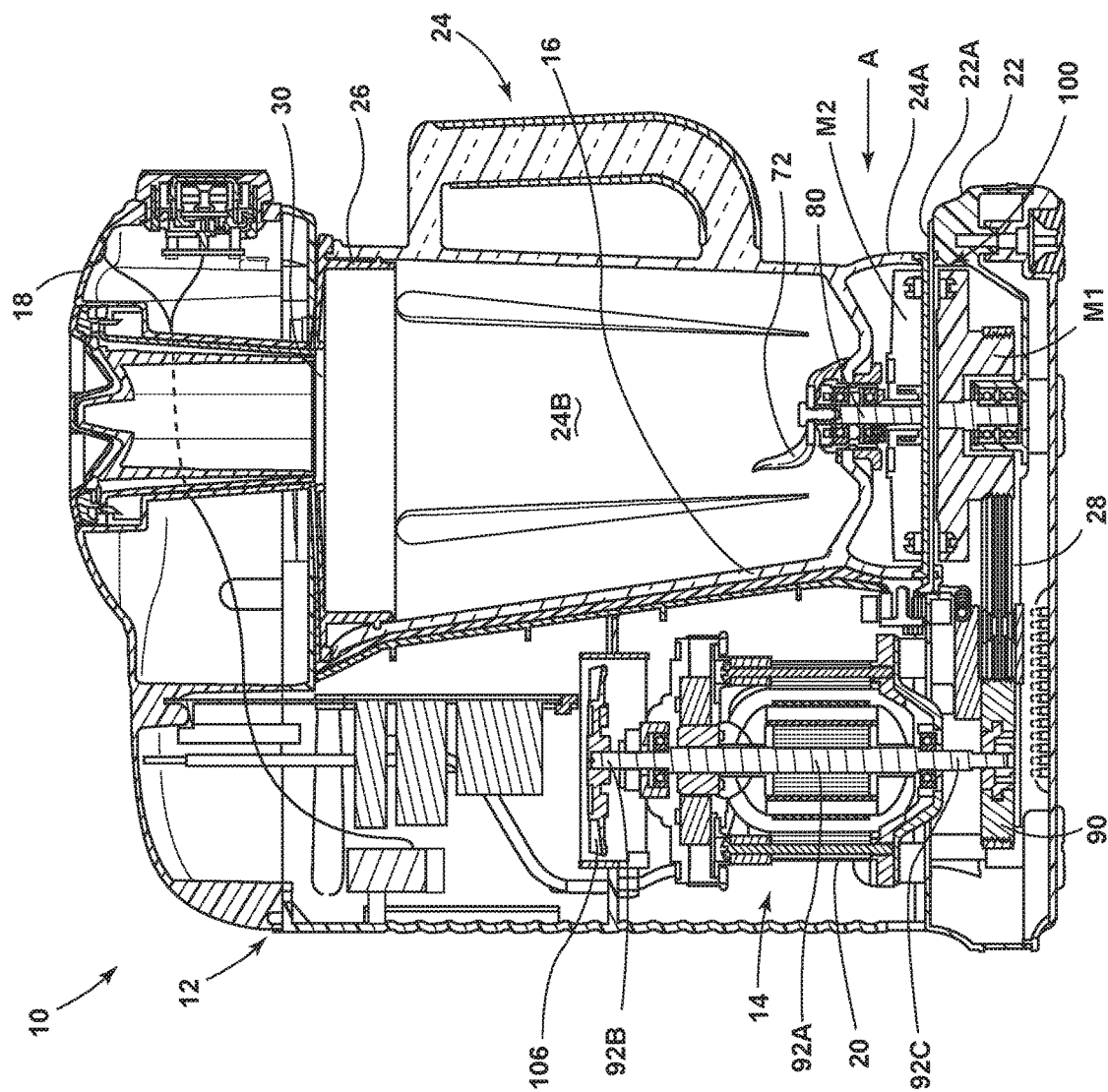
FIG. 1 is a cross-sectional view of one embodiment of a blending appliance.

For purposes of description herein, the terms "upper," "lower," "right," "left," "rear," "front," "vertical," "horizontal," and derivatives thereof shall relate to the concept as oriented in FIG. 1. However, it is to be understood that the concept may assume various alternative orientations, except where expressly specified to the contrary. It is also to be understood that the specific devices and processes illustrated in the attached drawings, and described in the following specification are simply exemplary embodiments of the concepts defined in the appended claims. Hence, specific dimensions and other physical characteristics relating to the embodiments disclosed herein are not to be considered as limiting, unless the claims expressly state otherwise.

Referring to FIG. 1, reference numeral 10 generally designates a blending appliance. The blending appliance includes a housing 12 having a motor compartment 14 and a jar receiving portion 16 spaced laterally therefrom to define a cavity. The jar receiving portion 16 includes an upper housing or upper retaining member 18. A motor 20 is disposed in the motor compartment 14. A support base 22 is operably coupled to the housing 12. A blender jar 24 includes a lid 26 with a feed chute 30. The jar 24 and lid 26 are configured for lateral reception in the jar receiving portion 16. The lid 26 is vertically secured on the jar 24 by the upper housing 18 upon reception of the jar 24 into the jar receiving portion 16.

Referring again to FIG. 1, the illustrated blending appliance 10 is generally configured to include a low profile to easily accommodate use under a cupboard or shelf in a kitchen area. The jar 24 of the blending appliance 10 is designed to engage the housing 12 from a lateral direction as indicated by arrow A. Most traditional blending appliances include a construction that mandates vertical or drop-in placement of a jar onto a base that includes a motor therein. Unfortunately, these constructions require substantial vertical space above the base, and when connected with a jar, provide for a very tall overall appliance.

Figure 2:
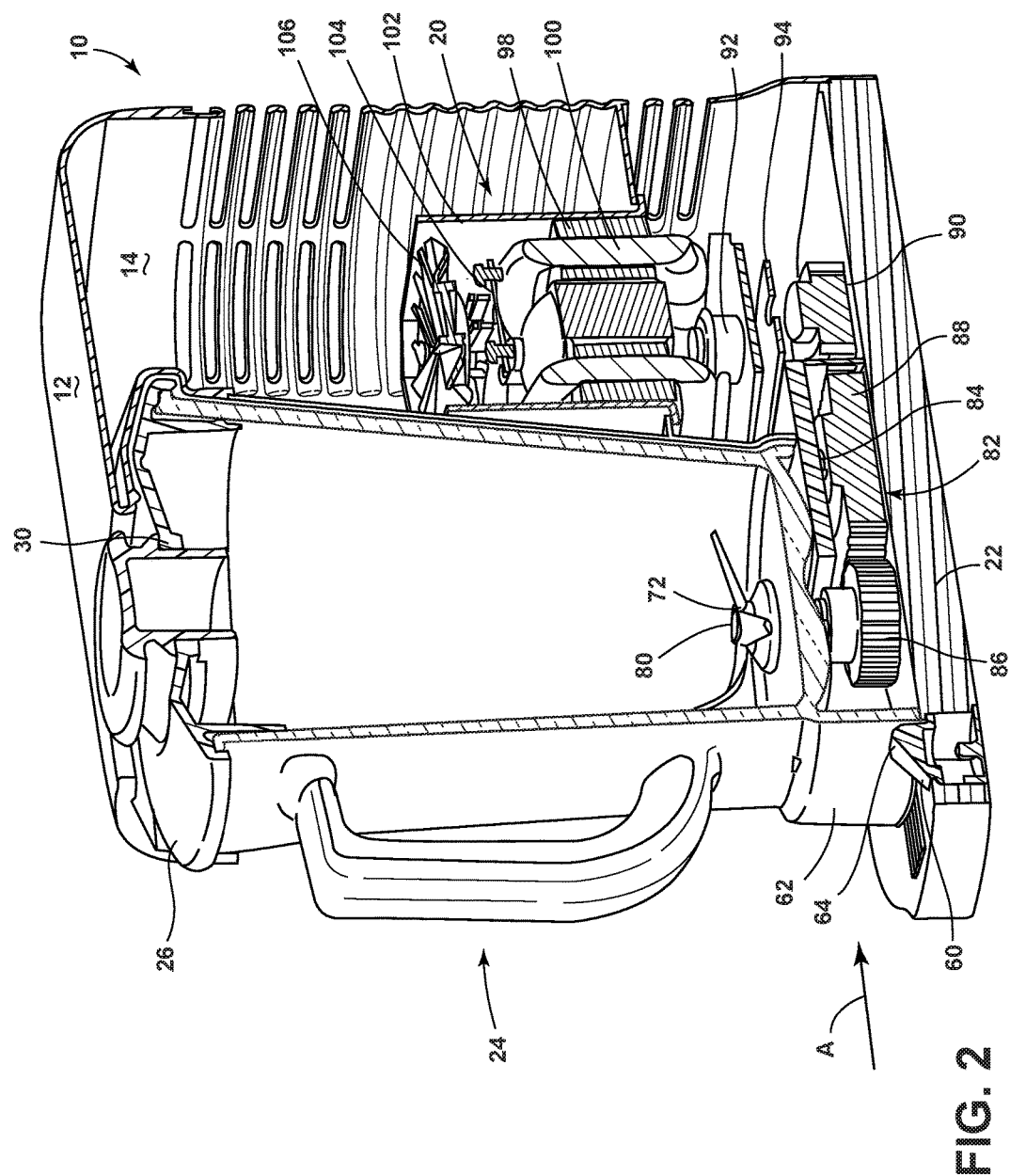
FIG. 2 is a front perspective cross-sectional view of the blending appliance of FIG. 1.
Figure 3:
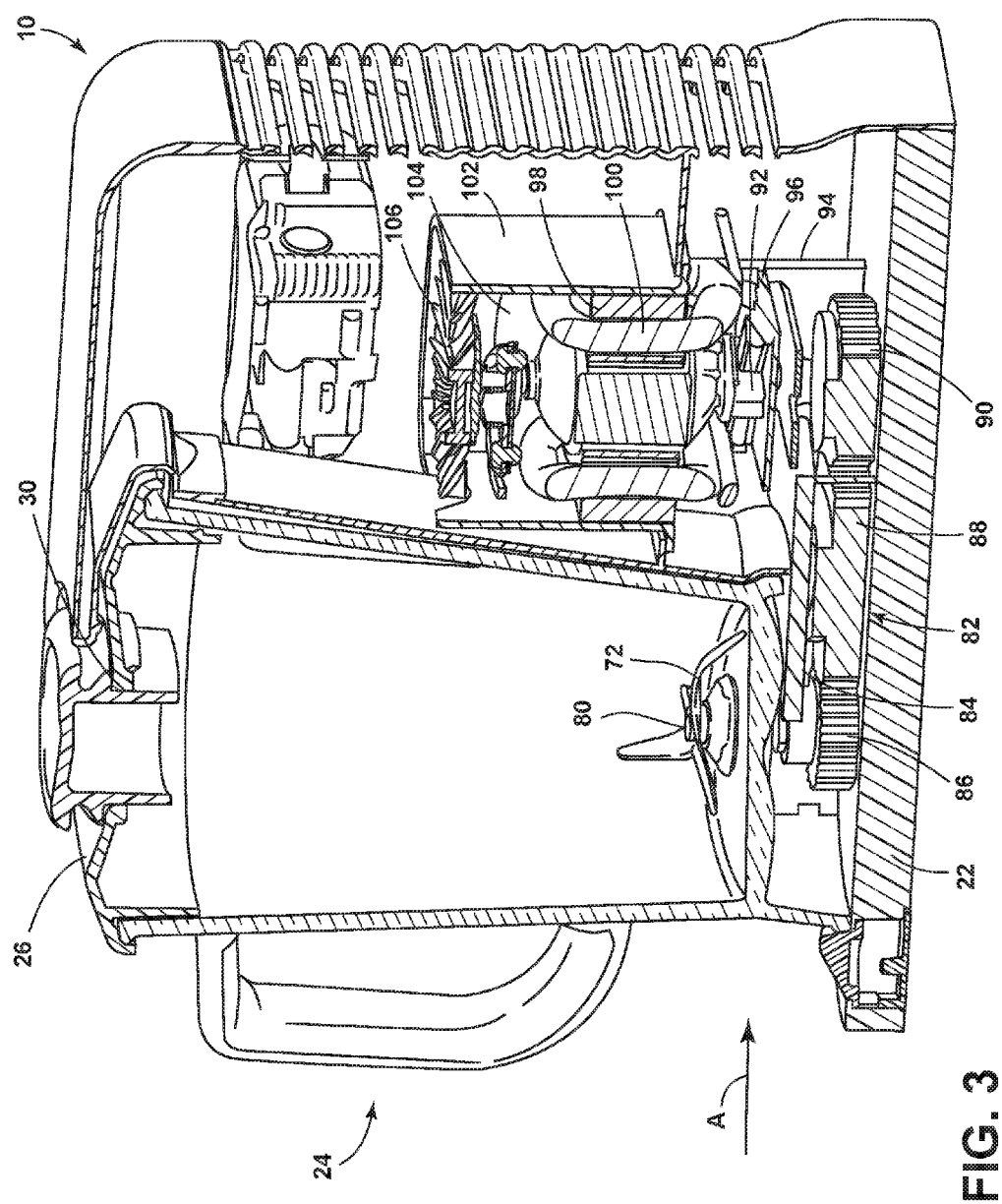
FIG. 3 is a rear perspective cross-sectional view of the blending appliance of FIG. 1.

Referring now to FIGS. 2 and 3, the inner componentry of the blending appliance 10 of the illustrated embodiment will be discussed. As illustrated, a blade assembly 72 of the blending appliance 10 is fixedly engaged with a jar drive shaft 80. The jar drive shaft 80 extends downward through a bottom portion of the jar 24 and is sealed by gaskets. The bottom of the jar drive shaft 80 is configured to engage a gear assembly 82 disposed below the jar 24. The gear assembly 82 is positioned above the support base 22 in a gear housing 84. In the illustrated embodiment, there are three gears that relay rotational forces from the motor 20 to the blade assembly 72. However, it is contemplated that more or less gears may be utilized in the blending appliance 10. In addition, it is also contemplated that a belt driven system may be utilized that requires less gears overall, as shown in FIG. 1 at reference numeral 28. In the illustrated embodiment of FIGS. 2 and 3, a jar drive gear 86 is disposed below and coupled to the jar drive shaft 80 for rotation therewith. The jar drive gear 86 is rotatably engaged with a transition gear 88, which is operably engaged with a motor drive gear 90. The motor drive gear 90 is fixedly connected with a drive shaft 92 that extends downwardly from the motor 20. The drive shaft 92 is supported by a drive shaft bracket 94. The entire motor assembly 20 is supported over a motor bracket 96 inside the motor compartment 14, as best shown in FIG. 3. In the illustrated embodiment, the motor 20 includes a magnet 98 and a winding assembly 100 that is protected by a motor shroud 102. The motor shroud 102 protects the motor 20 and keeps it free of moisture and debris. A shroud bracket 104 is disposed inside the motor shroud 102 and supports a fan assembly 106 disposed above the motor 20. The fan assembly 106 moves air inside the motor compartment 14, preventing or minimizing the likelihood of the motor 20 overheating.

Figure 6B:
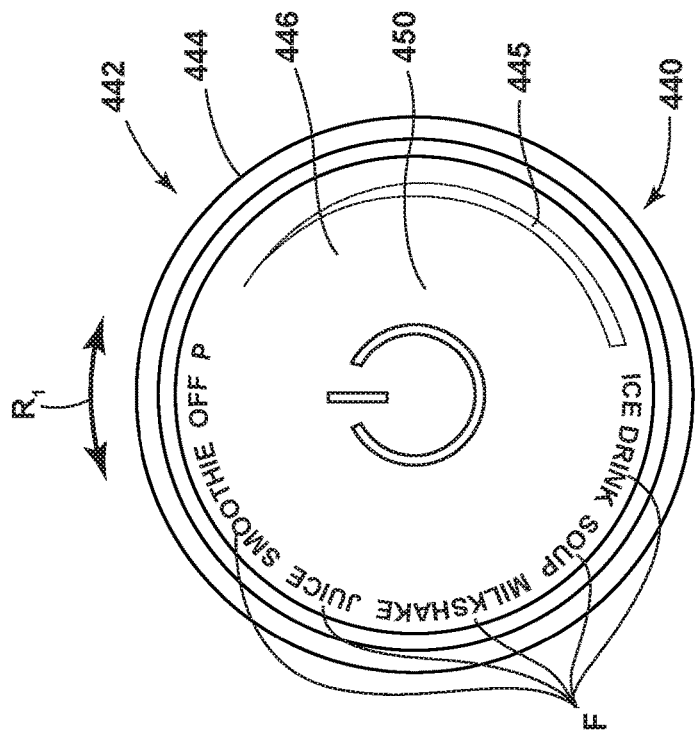
FIG. 6B is a front elevational view of the user-interface of FIG. 6A.
Figure 6A:
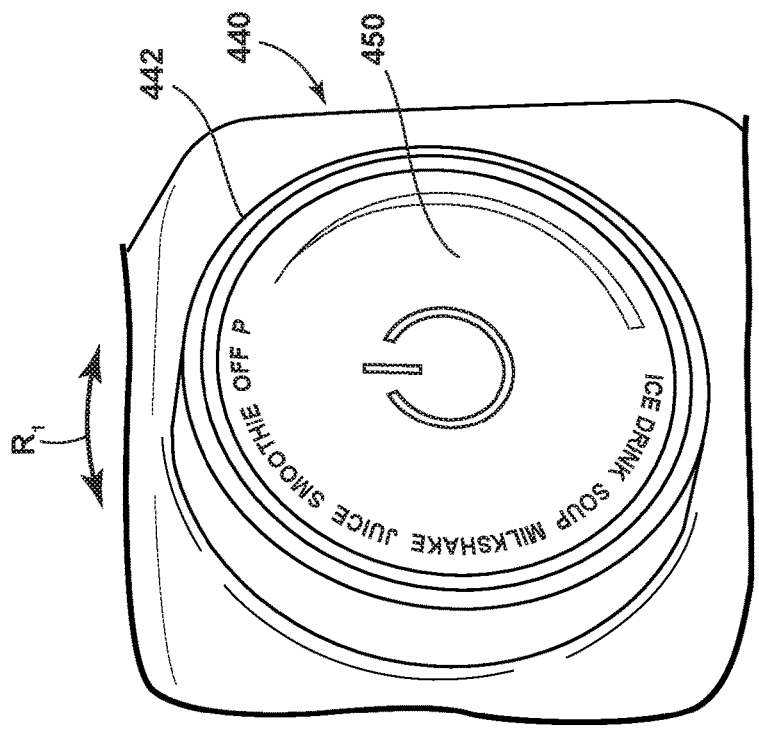
FIG. 6A is a perspective view of the user-interface of FIG. 5.

Referring now to FIG. 4, a user interface 440 is shown in the form of an exploded rotating dial assembly 442. The dial 442 generally includes an outer ring 444 which is engaged by a user and rotated along a rotational path $R_1$ as indicated in FIGS. 6A, 6B. The outer ring 444 is disposed about a central aperture 446 of the dial 442 in which a central push button 450 is disposed in assembly. Both the dial 442 and push button 450 may be comprised of a thermoset body portion having a metallic coating. In assembly, the push button 450 remains stationary while the dial 442 rotates along rotational path $R_1$. The stationary positioning of the push button 450 is generally provided by a rotor post 452 engaging a rotary plate 454 through a slot 455 disposed thereon. The rotary plate 454 is disposed within a retainer 456 in assembly. A printed circuit board (PCB) 460 is mounted on a central portion of the rotary plate 454. The PCB 460 includes one or more LEDs 462 and a tactile switch 464. A plastic window 466 is aligned with the LEDs 462 of the PCB 460 and is further disposed within the push button 450 in assembly. A biasing spring 470 is disposed between the push button 450 and the rotary plate 454, thereby biasing the push button 450 outwardly in a direction as indicated by arrow 472. In this way, the push button 450 can be pushed by a user, inwardly in a direction as indicated by arrow 474, to activate the tactile switch 464 disposed on the PCB 460. By engaging and pushing the push button 450, the user makes a selection for a given function as determined by the rotating dial 442 as further described below.

As further shown in FIG. 4, a plurality of fasteners 480 couple the rotary plate 454 to a mounting portion 447 of the dial 442. As coupled together, the dial 442 and rotary plate 454 are received within an interior portion 457 of the retainer 456. As best shown in FIG. 5, the retainer 456 is adapted to retain the user interface assembly 440 on a location disposed on the upper housing 402 via clips 458 which are resiliently flexible to engage the upper housing 402. The upper housing 402 is contemplated to function as upper retaining member 18 as shown in FIG. 1. As shown in FIGS. 4 and 5, a main PCB 490 includes a potentiometer 492 which is adapted to read an input from the user interface 440 for performing a preselected function of a blending appliance on which the user interface assembly 440 is disposed. A plurality of fasteners 494 are adapted to couple the main PCB 490 to the retainer 456 via mounting portions 459 disposed on the retainer 456.

Referring now to FIGS. 6A and 6B, the user interface 440 includes a plurality of functions F which are disposed at discrete locations around the dial 442. In use, a user will rotate the dial 442 along rotational path $R_1$ until a selected function F is disposed at a reference point which may be indicated by lighting up the particular function or by using an audible indicator. As shown in FIG. 6B, the functions F may include, but are not limited to, iced drink, soup, milkshake, juice, smoothie, as well as an off position, and a progressive blending speed indicator scale identified as reference numeral 445. Once the user has rotated the dial 442 to a desired function F, the user will push the central push button 450 to initiate a specific blending sequence related to the selected function F. The design of the user interface 440 allows the dial 442 to rotate a full 360 degrees in either direction along rotational path $R_1$ while the center push button 450 remains stationary.

Referring now to FIGS. 7 and 8, a bearing assembly 500 includes a metal blade assembly 502 which is coupled to a shaft 504 by a fastener 506, which operate in a manner similar to blade assembly 72 and drive shaft 80 shown in FIG. 1. The shaft 504 is pressed into and received within first and second radial bearing assemblies 510, 512. The radial bearing assemblies 510 and 512 are separated by a spacer 514 and are clearance-fit to a housing 516 defined by a retainer 520. The retainer 520 includes a threaded lower portion 522 which engages a threaded nut 528 in assembly. The retainer 520 is adapted to be received within an aperture 550 disposed within a lower portion 62B of jar 24A. The retainer 520 further includes a head portion 524 which abuts the aperture 550 in the jar 24A in assembly. A wave spring 532 is a compressible biasing mechanism that abuts a retainer clip 530 at an upper end, and further abuts the upper radial bearing assembly 510 at a lower end. The retainer clip 530 is disposed in an inset portion 526 within the housing 516 of the retainer 520. A seal 534 is disposed above the retainer clip 530 and is adapted to keep debris out of the bearing assembly 500. The wave spring 532, abutting the retainer clip 530 and the first bearing 510, provides a constant downward force on the first and second bearings 510, 512 as indicated by arrow 552. This constant downward force indicated by arrow 552 eliminates potential for jar rotation when the shaft 504 and blade assembly 502 are rotating in use. As further shown in FIG. 7, the threadable nut 528 includes a lower brake surface 529 for use with a brake mechanism as further described below.

Referring now to FIG. 9, an interlock switch assembly 600 is shown disposed in an interior 402A of an upper housing 402 of a blending appliance 10A. The interlock switch assembly 600 includes a switch housing 602 which further includes a vertical portion 602A and a horizontal portion 602B. Disposed on the vertical portion 602A, one or more electrical air gap switches 604 are mounted, as shown in this embodiment, to mounting posts 606 and upper and lower clip mechanisms 608 and 610. In this way, one or more electrical switch assemblies 604 are snap-fit to the switch housing 602. The horizontal portion 602B of the switch housing 602 is secured to the lower portion 403 of the upper housing 402 via mounting cylinders 612, 614. The mounting cylinders 612, 614 are disposed on mounting posts 403A of the lower portion 403 of the upper housing 402. The horizontal portion 602B of the switch housing 602 coupled to the mounting posts 403A and 403B using fasteners. A spring-backed lever 620 is further disposed on the horizontal portion 602B of the switch housing 602. The lever 620 includes first, second, and third contact surfaces 622, 623, and 624, which are disposed along a periphery of a main body portion 626. The lever 620 is a spring-backed lever which is operable between on and off positions as further described below.

Referring now to FIGS. 10A and 10B, the interlock switch assembly 600 is shown with the switch housing 602 having the switch assembly 604, shown in FIG. 9, removed. The body portion 626 of the lever 620 includes an outwardly extending mounting rod 628 and a retention clip 630. A torsion spring 632 is mounted on the mounting rod 628 and includes an outwardly extending arm 624 which is retained by the retention clip 630 to bias the lever 620 to an "OFF" position as shown in FIG. 10A. As further shown in FIG. 10A, the mounting rod 628 is nested into a pivot cradle 636 disposed on the horizontal portion 602B of the switch housing 602. The torsion spring 632 biases the lever 620 to the off position as indicated by arrow 638. As shown in FIG. 10A, when the switch 620 is in the off position, the first contact surface 622 is disposed below the horizontal portion 602B of the switch housing 602. The second contact surface 623 abuts an abutment portion 603 disposed on the horizontal portion 602B to limit the movement of a lever 620 in the direction indicated by arrow 638.

Referring now to FIG. 10B, the lever 620 is in an "ON" position such that the lever 620 is adapted to articulate between on and off positions along an arcuate path as indicated by arrow $R_2$. In the on position, the torsion spring 632 is loaded and prepared to move the lever 620 to the off position as shown in FIG. 10A. When in the on position, the third contact surface 624 of the switch 620 abuts an abutment portion 605 of the switch housing 602. Referring again to FIG. 9, the lever 620 is moved to the on position when the jar 24 is received in a jar receiving portion of a blending appliance, such as jar receiving portion 16 of blending appliance 10 shown in FIG. 1. As received in the jar receiving area 16, the lid 560 of the jar 24 has an upper-most portion 569A disposed on the raised or ramped portion 569 of the lid 560. As the jar 24 is received in the jar receiving area 16, the upper-most portion 569A of the lid 560 contacts the first contact surface 622 of the lever 620, thereby moving the lever 620 to the on position as shown in FIGS. 9 and 10B. In the on position, the lever 620 activates the air gap switch 604 to provide power to the blending appliance 10 as further described below. When the blender jar 24 is removed from the blending appliance 10, the torsion spring 632 biases the lever 620 to the off position, such that the blending appliance 10 is cut-off from power by the interlock switch assembly 600. As further shown in FIG. 9, the third engagement surface 624 is adapted to contact a lever 607 disposed on the switch 604 which in turn activates an activation button 609 to provide power to the blending appliance 10 when the lever 620 is in the on position.

Referring again to FIG. 1, the blender jar 24 is shown received in the blender jar receiving area 16. The motor 20 is adapted to drive a drive shaft 92A having upper and lower portions 92B and 92C. The lower end 92C of drive shaft 92A is adapted to power or drive a first pulley 90 which is connected to a first or lower magnetic coupler M1 via a belt 28. A magnetic coupling system 100 includes lower and upper (first and second) magnetic couplers M1 and M2. The lower magnetic coupler M1 is disposed adjacent to a receiving deck 22A of the jar receiving area 16 which encapsulates the lower magnetic coupler M1 within the support base 22 of the blending appliance 10. The upper magnetic coupler M2 is disposed within a base portion 24A of the jar 24. The upper magnetic coupler M2, disposed with the base portion 24A of jar 24, is removed from the blending appliance 10 when the jar 24 is removed from the jar receiving area 16. The upper magnetic coupler M2 is coupled to the jar drive shaft 80. An upper end of the drive shaft 80 is connected to a blade assembly 72 which is fully disposed within a receptacle portion 24B of the jar 24. As shown in FIG. 1, the magnetic coupling system 100 magnetically couples the jar 24 to the support base 22 of the blending appliance 10 through the magnetic attraction generated between lower and upper magnetic couplers M1, M2. As shown in the embodiment of FIG. 1, the first and second magnetic couplers M1 and M2, have a generally circular or disc configurations at a prescribed diameter, such that the jar 24 will properly seat on the receiving deck 22A due to the magnetic coupling and attraction forces between the lower and upper magnetic couplers M1, M2. In assembly, the motor 20 drives the drive belt 28, as described above, thereby driving the lower magnetic coupler M1. Due to the magnetic coupling of the lower magnetic coupler M1 to the upper magnetic coupler M2, the upper magnetic coupler M2 rotates the drive shaft 80 in a direction which corresponds to the rotational path of the lower magnetic coupler M1. In this way, the lower and upper magnetic couplers M1, M2 drive the blade assembly 72 disposed within the receptacle portion 24B of the jar 24 through a magnetic torque coupling, rather than a mechanical coupling, thereby allowing for the lateral reception of the jar 24 into the jar receiving portion 16 along the path indicated by arrow A.

Figure 11A:
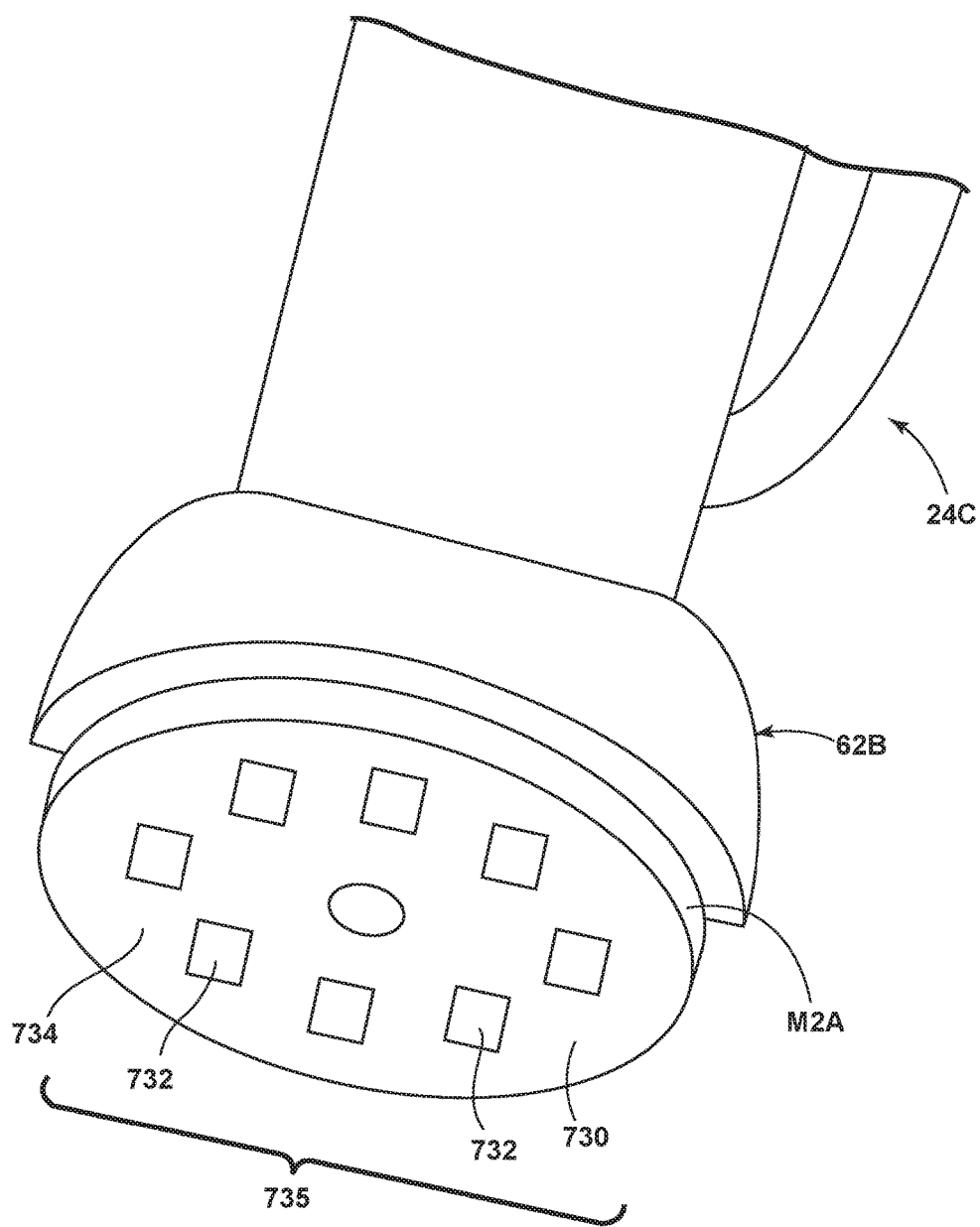
FIG. 11A is a bottom perspective view of a base portion of a blender jar.
Figure 11B:
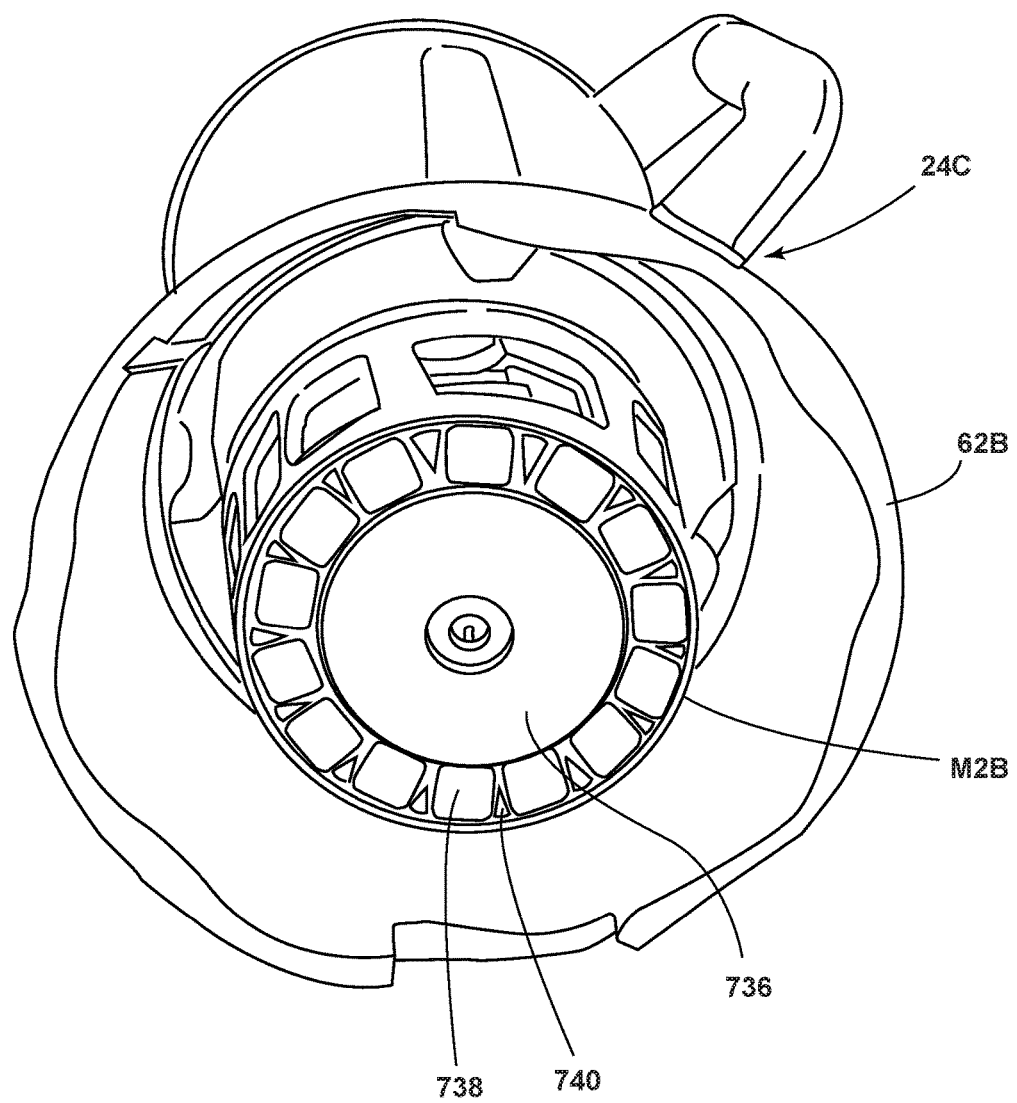
FIG. 11B is a bottom perspective view of another embodiment of a base portion of a blender jar.

Referring now to FIGS. 11A and 11B, a base portion of 62B of another blender jar 24C is shown having upper magnetic coupler M2A disposed thereon. The upper magnetic coupler M2A includes a generally planar body portion 730 in the form of a disc having a plurality of magnetic elements 732 disposed along a periphery 734 of the disc 730. The magnetic elements 732 are disposed about the periphery 734 to define a magnetic array 735. As shown, the magnetic elements 732 are individual magnetic elements which are separated by portions of the disc 730 which is contemplated to be made of a non-magnetic polymeric material. In the embodiment shown in FIG. 11B, a blender jar 24C includes a base 62B having an upper magnetic coupler M2B with a disc portion 736 having a plurality of magnets 738 disposed within an outer channel 740 of the disc 736. In this configuration, it is contemplated that the individual magnetic elements 738 are aligned on a metallic disc disposed in the channel 740, such that the magnetic elements 738 are not individually separated by a polymeric material, such as found in the embodiment of FIG. 11A. While the configurations shown in FIGS. 11A and 11B include a plurality of individual magnetic elements 732, 738, it is contemplated that the magnetic elements, as disposed in the lower and upper magnetic couplers M1, M2, M2A, M2B, may be comprised of continuous metallic rings, or other like shapes, for providing a sufficient coupling in the magnetic coupling system 100.

Figure 12:
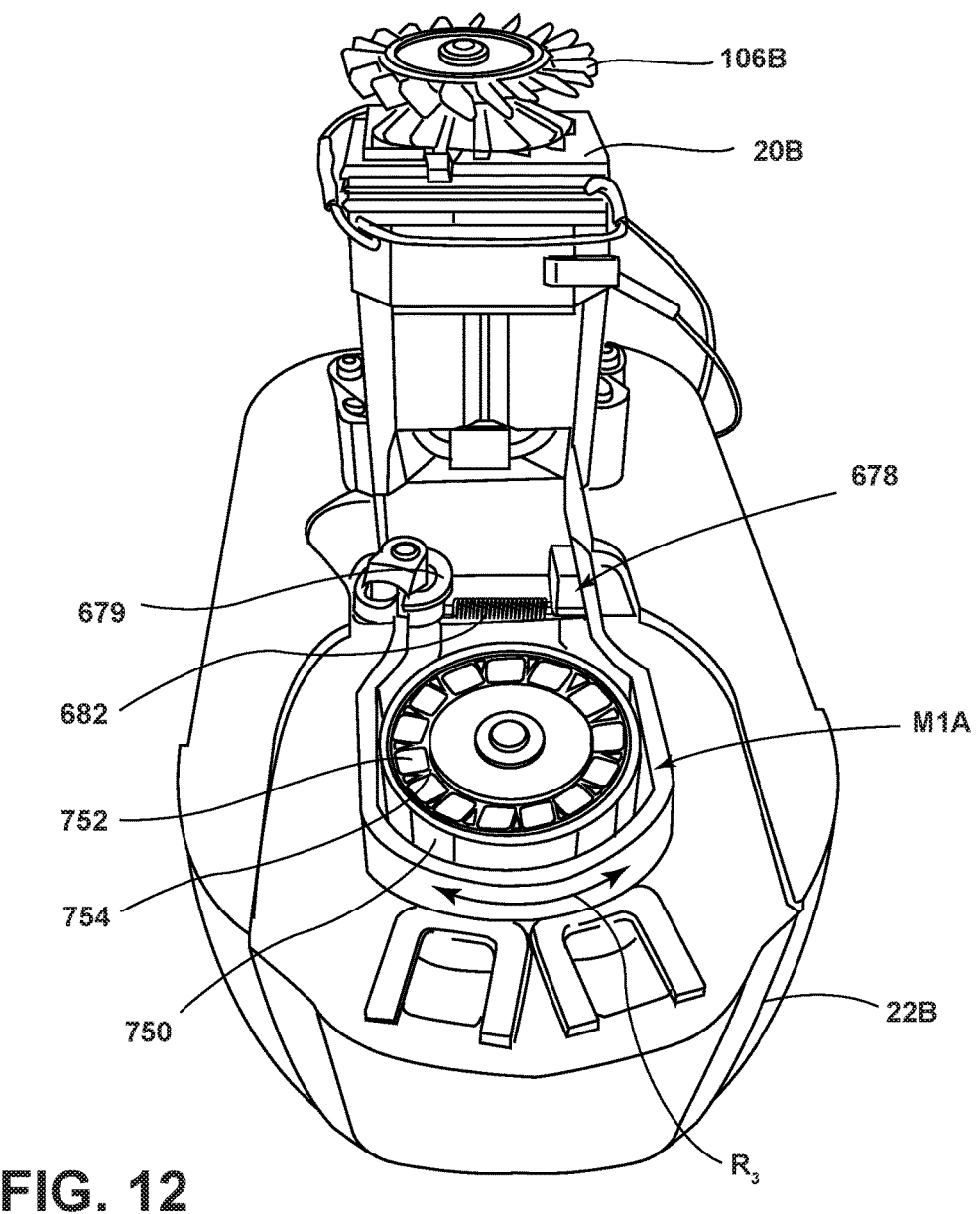
FIG. 12 is a top perspective view of another embodiment of a base portion of a blender appliance.

Referring now to FIG. 12, a support base 22B and motor 20B are shown with the belt drive system 678 coupled to the motor 20B and further coupled to another embodiment of a lower magnetic coupler M1A. In this embodiment, a tensioner pulley 679 is incorporated into the belt drive system 678 to reduce slack within the belt 682. It is further contemplated that the belt 682 can be a flexibly resilient or elastic belt that does not require a tensioner pulley, such as tensioner pulley 679. Having a belt 682 that is elastic in nature, provides for a belt drive system 678, wherein the belt 682 can also store energy from the motor 20B to the lower magnetic coupler M1A. As further shown in this embodiment, the lower magnetic coupler M1A includes a disc portion 750 having a plurality of magnetic elements 752 disposed within an outer channel 754 of the disc 750. The magnetic array of magnetic elements 752 shown in this embodiment is akin to the magnetic array of magnetic elements 738 shown in FIG. 11B. Again, as noted above, the motor 20B is adapted to drive the lower magnetic coupler M1A in a direction as indicated by arrow $R_3$.

With regards to the magnetic coupler system 100, as shown and described above, it is contemplated that a plurality of nonmagnetic layers will exist between the lower and upper magnetic couplers M1, M2. Such nonmagnetic layers may be disposed on the support base 22 of the blending appliance 10, or may be included on the base portion 24A of the blender jar 24, or both. In this way, the magnetic elements disposed within the lower and upper magnetic couplers M1, M2 do not contact one another, such that the torque provided by the lower magnetic coupler M1 will transfer to the upper magnetic coupler M2 purely through magnetic attraction forces that exist across the nonmagnetic layers which may also include an air gap.

When a blender, such as blending appliance 10 (FIG. 1), is run at higher speeds, e.g. typically between about 4000 revolutions per minute (rpm) to about 22,000 rpm, an air pocket may form around the blades of the blade assembly 72 within the blender jar 24. This air pocket, called a bridge or the effect bridging, may prevent ingredients disposed within the receptacle portion 24B of the blender jar 24 from contacting the blade assembly and being circulated within the jar 24. Thus, the bridging effect may prevent such ingredients from being properly processed during a blending sequence which involves high speeds. This situation may require a user to shake the jar 24 or use some other type of interrupting implement to break the bridge.

Another way to break the bridge is to slow the rotational speed of the blade assembly 72 (FIG. 1). The present blending appliance 10 is configured to store kinetic energy in one of or both of the upper and lower couplers, which may be magnetic couplers like couplers M1 and M2 discussed above. As a result, the blending appliance 10 can run at a lower rotational speed (as low as 500 rpm) while still blending the contents of the blender jar 24. Such a lower speed aids in the control of bridging material found in known high speed blending devices and provides energy savings as well. In the present blending appliance 10, the amount of time the blade assembly 72 can operate at a rotational speed that is under 1000 rpm ranges from approximately about 2 to about 6 seconds, as further described below and with reference to FIGS. 13A-15.

The power for the blending appliance 10, as shown in FIG. 1, initially comes from the motor 20, which turns lower and upper magnetic couplers M1, M2 and further turns the blender blade assembly 72. As powered by the motor 20, the lower and upper couplers M1, M2 are adapted to store energy like an inertia driven flywheel when the motor 20 is energized and turning the blender blade assembly 72. Thus, the magnetic coupler system 100 operates to store rotational energy in the lower and upper magnetic couplers M1, M2 which have a mass that provides an effective amount of inertia in the lower and upper magnetic couplers M1, M2, such that the lower and upper magnetic couplers M1, M2 are resistant to changes in rotational speed. Energy is transferred to lower and upper magnetic couplers M1, M2 by applying torque to lower and upper magnetic couplers M1, M2 from the motor 20. This torque realized on the lower and upper magnetic couplers M1, M2 increases their rotational speed, which thereby increases the rotational energy stored in the lower and upper magnetic couplers M1, M2. The lower and upper magnetic couplers M1, M2 can release the rotational energy stored therein by applying torque to a mechanical load, such as the blade assembly 72. Applying torque to the mechanical load (blade assembly 72) decreases the rotational speed of the lower and upper magnetic couplers M1, M2 as the rotational energy is released. The storage of the kinetic energy is actually realized in the system as a whole, from the motor 20 to the blade assembly 72. While the stored kinetic energy is discussed within this disclosure with specific reference to the lower and upper magnetic couplers M1, M2, this disclosure is not meant to limit the storage and release of kinetic energy to the lower and upper magnetic couplers M1, M2 alone.

FIGS. 13A-15 include graphical representations of current, rpm, and voltage changes in a motor and blade assembly that result in an overall energy savings by using an inertia driven flywheel mechanism in the lower coupler M1 of the blending appliance 10. With specific reference to FIGS. 14A and 14B, a blending sequence is shown, wherein voltage across a motor, such as the motor 20 shown in FIG. 1, is decreased and rotational energy, stored as kinetic energy in the lower coupler M1, is released for a period of time to rotate the blade assembly 72 while the motor 20 is running at a low voltage setting. This stored energy turns the upper and lower magnetic couplers M1, M2 and the blender blade assembly 72, such that the blender blade assembly 72 continues to mix ingredients in the jar 24 while the motor 20 remains at the low voltage setting. This method of blending keeps the blender motor 20 cool and helps to balance forces in the blender jar 24, thereby lowering the tendency of ingredients to bridge in blender jar 24. Thus, as shown in FIGS. 14A and 14B, two reference points A and B are indicated along the blending sequence shown in FIGS. 14A and 14B. As best shown in FIG. 14B, the rpm of the blade assembly 72 at reference point A is approximately 5550 rpm. At reference point B, the rotational speed of the blade assembly 72 has decreased from 5550 rpm to approximately 2200 rpm. This decrease in rotational speed is generally due to the motor 20 being operated at a steady low voltage setting of approximately 12.3 volts at reference point A, and approximately 16.2 volts at reference point B. The amount of electricity used between reference point A and B is also shown in FIG. 14B in amps, with the first reading at reference point A being 1.2 amps, and the second reading at reference point B being 4.8 amps. Thus, as shown in FIG. 14B, the motor 20 was provided with a high voltage and amp setting at reference point C to get the rotational speed of the blade assembly 72 to approximately 5550 rpm. The high voltage and amp setting may include a voltage of about 80 volts to about 100 volts, or more likely about 90 volts, during this ramp-up stage in the blending sequence at reference point C. The amperage or amp setting required at this ramp-up stage at reference point C is contemplated to be about 20 amps to about 40 amps, or more likely 30 amps, to get the motor 20 up to about 6000 rpm and the blade assembly 72 up to approximately 5550 rpm. When the motor 20 was set to a steady low voltage and amp setting, approximately 10-20 volts and 1-5 amps, the rotational speed of the blade assembly 72 gradually decreased from 5550 rpm to 2200 rpm from reference point A to reference point B, as shown in FIG. 14B. Having the rotational speed of the blade assembly 72 decrease from 5550 rpm to 2200 rpm, the blade assembly 72 is still capable of processing ingredients disposed within the blender jar 24. This slower rotation, as noted above, can also help resolve or sufficiently diminish any bridging effect of the ingredients, to ensure that the ingredients are thoroughly mixed. This slower rotational speed of the blade assembly 72 indicated from reference point A to reference point B also provides an energy savings using the inertia driven flywheel of the lower and upper magnetic couplers M1, M2, while the motor 20 runs at a steady low voltage and low amperage setting. As further shown in FIG. 14B, the rotational speed of the blade assembly 72 has a steady and gradual decline from reference point A to reference point B. This gradual decline is due to the steady release of kinetic energy from the lower magnetic coupler M1.

The kinetic energy may be stored in the lower magnetic couple M1 by the addition of mass in certain areas of the lower magnetic couple M1. The amount of the added mass, which may be a metallic mass or polymeric mass that is embedded or external to the lower magnetic coupler M1, and the location of the added mass may be varied given different jar configurations and motor sizes. An added mass of 300-500 grams is optimal to be added to the lower magnetic coupler M1 in the illustrated embodiment. This allows enough kinetic energy to be stored in the lower magnetic coupler M1, while still allowing the motor 20 to ramp up to a desired speed in a reasonable time. The amount of Kinetic energy stored is related to the following equation:

$$K_e = \tfrac{1}{2} \times (Iw^2)$$

where:

$K_e$=Kinetic Energy (Joules);
I=Moment of Inertia of the lower magnetic coupler M1 (kg m);
$w^2$=Rotational Velocity of the lower magnetic coupler M1 (rad/s).

As one skilled in the art would appreciate, by placing an added mass in varied amounts and in varied places on the lower magnetic coupler M1, the moment of inertia (I) may be optimized for different coupler and motor configurations.

It is also contemplated that the same equation and optimization may be run on the upper magnetic coupler M2.

When the motor voltage is reduced to a point where the blade assembly 72 is rotating at or below 1000 rpm, the lower magnetic coupler M1 releases stored kinetic energy. This allows the blade assembly 72 to continue spinning at speeds of about 500 rpm for approximately 2-6 seconds. This is a sufficient amount of time to break any bridging effect that may have been caused from running the blade assembly 72 at higher speeds. After the bridging effect is disrupted or sufficiently diminished, the voltage across the motor 20 is increased and the blade assembly 72 is accelerated to the desired high speed without the bridging effect present, and the process is repeated as necessary.

Figure 13A:
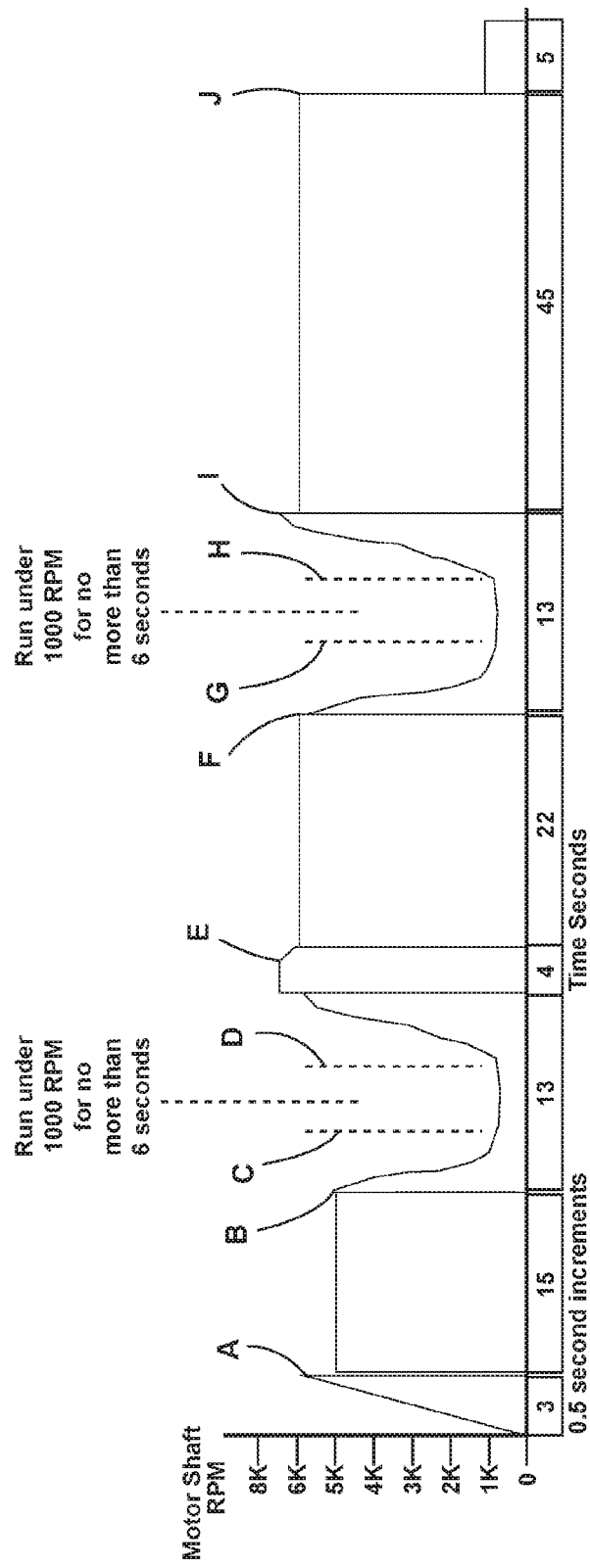
FIG. 13A is a schematic representation measuring rotational speed of a blender motor during a blending sequence.

With specific reference to FIGS. 13A and 13B, a blending sequence is shown in which the rotational speed of a motor, such as motor 20 shown in FIG. 1, is ramped up to approximately 6000 rpm at reference point A, and then allowed to run at 5000 rpm from reference point A to reference point B, as best shown in FIG. 13A. At reference point B, the rotational speed of the motor 20 is allowed to drop from 5000 rpm to a rotational speed that is lower than 1000 rpm for approximately 6 seconds as indicated between reference points C and D. The rotational speed of the motor 20 is then ramped up again at reference point E to approximately 6500 rpm, and continues to run at a steady state of approximately 6000 rpm from reference point E to reference point F. It is contemplated that approximately 90 volts across the motor 20 are required to ramp the motor speed up to 6500 rpm. Approximately 64.5 volts are necessary to run the motor 20 at the steady state of 6000 rpm. Further, approximately 25-35 amps are required to get the motor 20 up to 6500 rpm, while approximately 6 amps are required to run the motor 20 at the steady state of 6000 rpm. The rotational speed of the motor 20 drops from 6000 rpm to a rotational speed below 1000 rpm for no longer than 6 seconds, as indicated between reference points G and H. This reduction in motor speed is due to the motor 20 being run at a low voltage and low amperage setting. At the final portion of the blending sequence shown in FIG. 13A, the rotational speed of the motor 20 is again ramped up to approximately 5500 rpm and allowed to run at 5000 rpm from reference point I to reference point J. As specifically shown in FIG. 13B, the blending sequence between reference points B and E, as found in FIG. 13A, are examined. An associated voltage is also indicated between reference points B and E in FIG. 13B which shows that a decrease in voltage across the motor 20 decreases the rpm of the motor 20 to below 1000 rpm. This rotational speed is maintained by sending 8-10 volts to the motor 20 between reference points B and E. The rotational energy stored in the magnetic coupler, and specifically lower magnetic coupler M1, is released between reference points B and E to keep the blade assembly 72 moving, such that ingredients are still processed within the blender jar 24, and any bridging effect is decreased or eliminated due to the decreased rotational speed realized between reference points B and E. As the kinetic or rotational energy of the lower magnetic coupler M1 is released, the blade assembly 72 gradually slows down at a steady rate. While the rotational speed of the blade assembly 72 gradually decreases, the motor 20 remains at a low voltage and low amperage setting.

Figure 15:
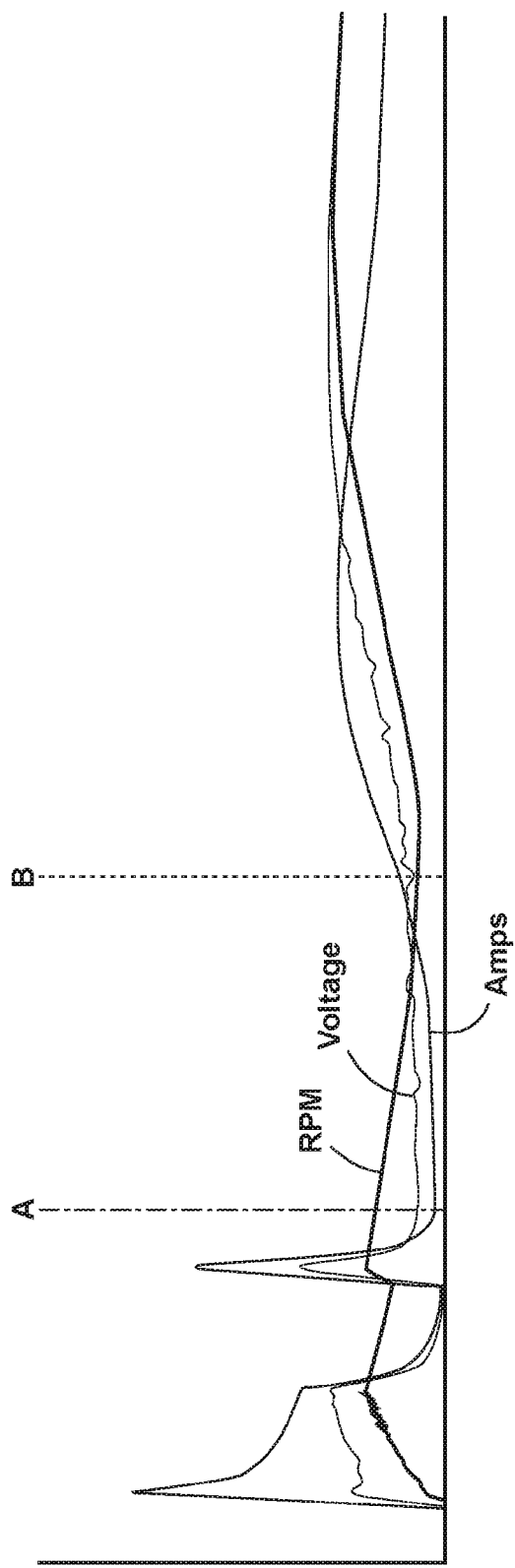
FIG. 15 is a schematic representation measuring rotational speed of a blender motor along with associated motor voltage and electrical current levels of a blending sequence.

Referring now to FIG. 15, a blending sequence is shown wherein the motor speed ramps down to approximately 1200 rpm from approximately 4000 rpm between reference points A and B. As further shown in FIG. 15, the motor amperage drops from approximately 30 amps in the ramp-up stage preceding reference point A, to about 1.25 amps at reference point A. The voltage across motor 20 also drops to approximately 10-20 volts as compared to 45 volts used during the ramp-up period shown just before reference point A. Thus, in the time frame indicated between reference points A and B, the magnetic coupling system 100 continues to turn the blade assembly 72 within the blender jar 24 as the lower magnetic coupler M1 releases stored rotational energy while the motor 20 draws a low current. In this way, energy is released from the magnetic coupling system 100, such that ingredients within the blender jar 24 can still be processed while a total energy savings is realized in the motor 20.

Figure 14A:
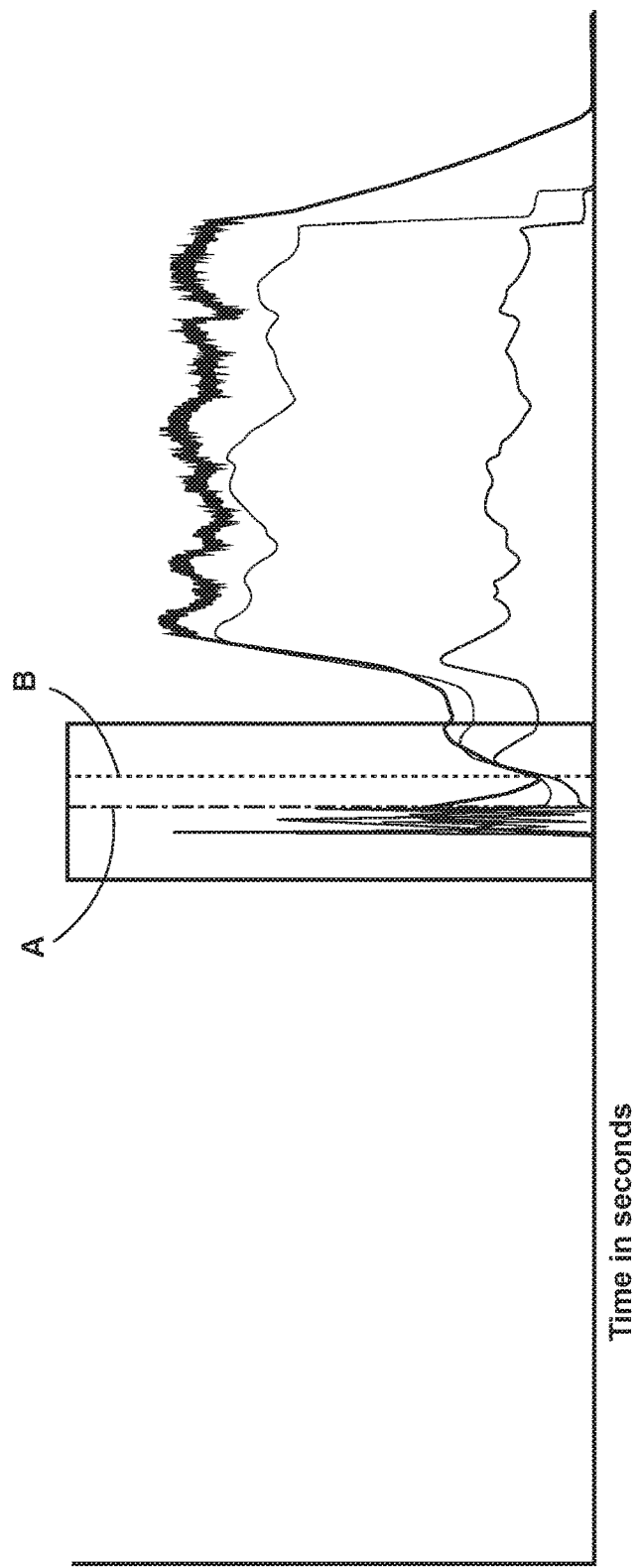
FIG. 14A is a schematic representation measuring rotational speed of a blender blade assembly along with associated motor voltage and electrical current levels of a blending sequence.
Figure 14B:
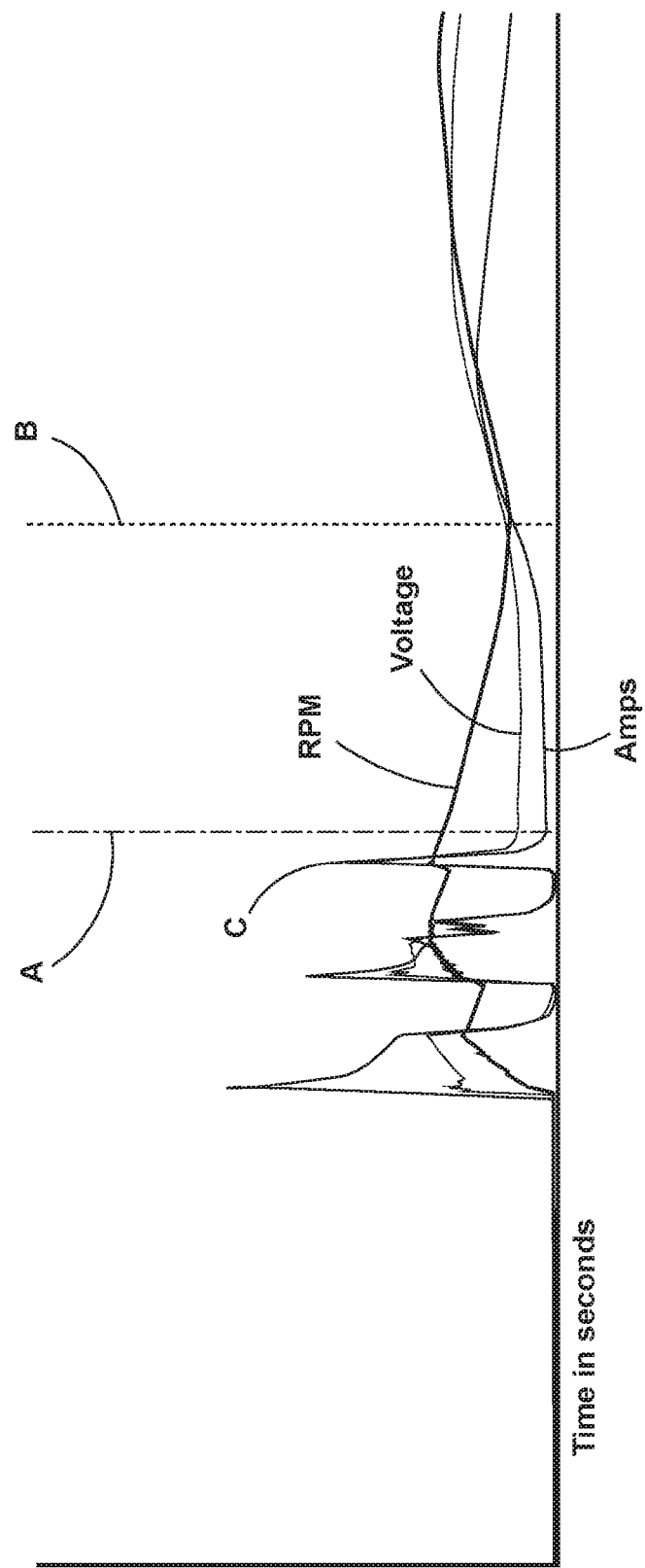
FIG. 14B is a zoomed-in schematic representation of a portion of the graph of FIG. 14A.

As powered by the motor 20, the rotational speed of the blade assembly 72 is directly related to the rotational speed of the motor 20. Using a gear assembly, such as gear assembly 82 shown in FIG. 2, or a belt drive system, such as belt drive system 678 shown in FIG. 12, the translated rotational speed of the blade assembly is about 0.925 times the rotational speed of the motor 20 or drive shaft 92A of FIG. 1. Referring again to FIGS. 13A-14B, a blending sequence is shown, wherein the blending sequence is configured to save energy and diminish a bridging effect. The voltage across the motor 20 is shown to be about 90 volts during the ramp-up stage at reference point A shown in FIG. 13B, which correlates to an increased motor speed of about 6500 rpm at reference point A shown in FIG. 13A. After the ramp-up stage, the motor 20 is maintained at approximately 5000 rpm between reference points A and B of FIG. 13A, which is a rotational speed sufficient enough to cause a bridging effect in ingredients being processed by an associated blade assembly being powered by the motor 20. This maintained speed requires a voltage setting in a range from about 50 to about 70 volts, more particularly about 64.5 volts, across the motor 20 and an amperage setting of about 4 to about 8 amps, more particularly about 5.8 amps. When the voltage is set to a low voltage setting, as indicated between reference points B and E of FIG. 13B, the speed of the motor 20 drops to a rotational speed below 1000 rpm, as shown in FIG. 13A. This reduced speed requires only a low voltage setting of about 8 to about 10 volts across the motor 20 between reference points B and E, shown in FIG. 13B, and a low amperage setting of about 1 amp to about 5 amps. The rotational speed of the motor 20 being below 1000 rpm, would normally correlate to a rotational speed of the blade assembly 72 being about 925 rpm. With kinetic energy released from the lower magnetic coupler M1, the rotational speed of the blade assembly 72 is gradually decreased and, as shown in FIG. 14B, slows from about 5500 rpm to about 2200 rpm. This reduced rotational speed of the blade assembly 72 is sufficient to disrupt the bridging effect of ingredients, such that an air pocket formed around the blade assembly 72 will be broken. When the bridging effect is disrupted, the ingredients will again contact the rotating blade assembly 72 for further processing.

It is contemplated that for any of the embodiments disclosed herein that the drive system could include a series of gears or belts, as generally described. In addition, a magnet drive system may also be utilized that does not include a physical coupling system. In this instance, the blade assembly inside the blender jar would be driven by opposing magnetic forces. The drive system would include a disc with magnets driven by a motor through a belt or gear drive. The jar would also include a disc with magnets that is driven by the motor driven disc.

It is also important to note that the construction and arrangement of the elements of the concept as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present concept. The exemplary structures and processes disclosed herein are for illustrative purposes and are not to be construed as limiting.

It is also to be understood that variations and modifications can be made on the aforementioned structures and methods without departing from the concepts of the present concept, and further it is to be understood that such concepts are intended to be covered by the following claims unless these claims by their language expressly state otherwise.

What is claimed is:

1. A method of reducing a bridging effect in a blending appliance, the method comprising the steps of:
    providing a blending appliance having a housing with a jar receiving area, a motor and a first magnetic coupler, wherein the first magnetic coupler is powered by the motor for rotation within an interior of the housing;
    providing a blender jar removeably supported in the jar receiving area of the housing, wherein the blender jar includes a receptacle portion disposed over a base portion, wherein the base portion of the blender jar includes a second magnetic coupler rotatably housed therein, wherein the second magnetic coupler is magnetically coupled to the first magnetic coupler for rotation therewith when the blender jar is received in the jar receiving area, and further wherein the second magnetic coupler is further coupled to a blade assembly disposed in the receptacle portion of the blender jar;
    providing ingredients to the receptacle portion of the jar;
    initiating an automated blending sequence wherein the automated blending sequence includes the steps of:
        rotating the first magnetic coupler at a first rotational speed using a first setting of the motor;
        processing the ingredients in the receptacle portion of the blender jar with the blade assembly rotating at a first rotational speed associated with the first setting of the motor for an amount of time sufficient to induce a bridging effect in the ingredients within the receptacle portion of the blender jar;
        decreasing the first rotational speed of the first magnetic coupler to a second rotational speed using a second setting of the motor;
        processing the ingredients in the receptacle portion of the blender jar with the blade assembly rotating at a second rotational speed associated with the second setting of the motor for an amount of time sufficient to disrupt the bridging effect in the ingredients within the receptacle portion of the blender jar; and
        increasing the second rotational speed of the first magnetic coupler to a third rotational speed after the bridging effect is disrupted using a third setting of the motor.

2. The method of claim 1, wherein the third rotational speed of the first magnetic coupler is greater than or equal to the first rotational speed.

3. The method of claim 1, wherein the third rotational speed of the first magnetic coupler is less than or equal to the first rotational speed.

4. The method of claim 1, wherein the first setting of the motor includes a rotational speed of the motor of about 5000 rpm to about 6000 rpm.

5. The method of claim 4, wherein the second setting of the motor includes a rotational speed of the motor of less than 1000 rpm.

6. The method of claim 5, wherein the amount of time sufficient to induce a bridging effect is an amount of time in a range from about 2 seconds to about 6 seconds.

7. The method of claim 6, wherein the rotational speed of the blade assembly is about 0.925 times the rotational speed of the motor.

8. A method of reducing a bridging effect in a blending appliance, the method comprising the steps of:
    providing a blending appliance having a housing with a jar receiving area, a motor and a first magnetic coupler, wherein the first magnetic coupler is powered by the motor for rotation within an interior of the housing;
    providing a blender jar removeably supported in the jar receiving area of the housing, wherein the blender jar includes a receptacle portion disposed over a base portion, wherein the base portion of the blender jar includes a second magnetic coupler rotatably housed therein, wherein the second magnetic coupler is magnetically coupled to the first magnetic coupler for rotation therewith when the blender jar is received in the jar receiving area, and further wherein the second magnetic coupler is further coupled to a blade assembly disposed in the receptacle portion of the blender jar;
    providing ingredients to the receptacle portion of the jar;
    initiating an automated blending sequence wherein the automated blending sequence includes the steps of:
        rotating the first magnetic coupler at a first rotational speed using the motor to further rotate the second magnetic coupler via magnetic torque;
        processing the ingredients in the receptacle portion of the blender jar with the blade assembly at the first rotational speed of the second magnetic coupler for an amount of time sufficient to induce a bridging effect in the ingredients within the receptacle portion of the blender jar;
        decreasing the first rotational speed of the second magnetic coupler to a second rotational speed;
        processing the ingredients in the receptacle portion of the blender jar with the blade assembly at the second rotational speed of the second magnetic coupler for an amount of time sufficient to disrupt the bridging
effect in the ingredients within the receptacle portion
of the blender jar; and increasing the second rotational speed of the second
magnetic coupler to a third rotational speed.

9. The method of claim 8, wherein the third rotational speed of the second magnetic coupler is greater than or equal to the first rotational speed.

10. The method of claim 8, wherein the third rotational speed of the second magnetic coupler is less than or equal to the first rotational speed.

11. The method of claim 8, wherein the motor provides a rotational speed of the motor of about 5000 rpm to maintain the second magnetic coupler at the first rotational speed.

12. The method of claim 11, wherein the motor provides a rotational speed of the motor of less than 1000 rpm to maintain the second magnetic coupler at the second rotational speed.

13. The method of claim 12, wherein the amount of time sufficient to induce a bridging effect is less than 6 seconds.

14. The method of claim 8, wherein the second magnetic coupler gradually decreases rotational speed from the first rotational speed to the second rotational speed.

15. A method of reducing a bridging effect in a blending appliance, the method comprising the steps of:

providing a blending appliance having a housing with a jar receiving area, a motor and a first coupler, wherein the first coupler is powered by the motor for rotation within an interior of the housing;

providing a blender jar removeably supported in the jar receiving area of the housing, wherein the blender jar includes a receptacle portion disposed over a base portion, wherein the base portion of the blender jar includes a second coupler rotatably housed therein, wherein the second coupler is operably coupled to the first coupler for rotation therewith when the blender jar is received in the jar receiving area, and further wherein the second coupler is operably coupled to a blade assembly disposed in the receptacle portion of the blender jar;

providing ingredients to the receptacle portion of the jar;

initiating an automated blending sequence wherein the automated blending sequence includes the steps of:

rotating the blade assembly at a first rotational speed using the motor to further rotate the first and second couplers;

processing the ingredients in the receptacle portion of the blender jar with the blade assembly at the first rotational speed for an amount of time sufficient to induce a bridging effect in the ingredients within the receptacle portion of the blender jar;

rotating the blade assembly at a second rotational speed, wherein the second rotational speed is less than the first rotational speed;

processing the ingredients in the receptacle portion of the blender jar with the blade assembly at the second rotational speed for an amount of time sufficient to disrupt the bridging effect in the ingredients within the receptacle portion of the blender jar; and rotating the blade assembly at a third rotational speed, wherein the third rotational speed is greater than the second rotational speed.

16. The method of claim 15, wherein the step of rotating the blade assembly at the first rotational speed further includes:

applying an amperage in a range from about 4 amps to about 8 amps to the motor.

17. The method of claim 16, wherein the step of rotating the blade assembly at the first rotational speed further includes:

applying a voltage in a range from about 50 volts to about 70 volts across the motor.

18. The method of claim 17, wherein the step of rotating the blade assembly at the second rotational speed further includes:

applying an amperage in a range from about 1 amp to about 5 amps to the motor.

19. The method of claim 18, wherein the step of rotating the blade assembly at the second rotational speed further includes:

applying a voltage in a range from about 8 volts to about 10 volts across the motor.

20. The method of claim 15, wherein the amount of time sufficient to induce a bridging effect is less than 6 seconds.

* * * * *